(12) United States Patent
Hörtner et al.

(10) Patent No.: US 7,039,521 B2
(45) Date of Patent: May 2, 2006

(54) METHOD AND DEVICE FOR DISPLAYING DRIVING INSTRUCTIONS, ESPECIALLY IN CAR NAVIGATION SYSTEMS

(75) Inventors: Horst Hörtner, Linz (AT); Dieter Kolb, Germering (DE); Gustav Pomberger, Linz (AT)

(73) Assignee: Siemens Aktiengesellschaft, Munich (DE)

( * ) Notice: Subject to any disclaimer, the term of this patent is extended or adjusted under 35 U.S.C. 154(b) by 79 days.

(21) Appl. No.: 10/485,968

(22) PCT Filed: Aug. 1, 2002

(86) PCT No.: PCT/DE02/02844

§ 371 (c)(1),
(2), (4) Date: Feb. 6, 2004

(87) PCT Pub. No.: WO03/017226

PCT Pub. Date: Feb. 27, 2003

(65) Prior Publication Data

US 2004/0236506 A1  Nov. 25, 2004

(30) Foreign Application Priority Data

Aug. 7, 2001  (DE) .................... 101 38 719

(51) Int. Cl.
*G06G 7/78* (2006.01)
(52) U.S. Cl. .................................... 701/211
(58) Field of Classification Search ............. 701/200, 701/211, 207, 208, 301; 382/104; 386/46, 386/125; 342/357.13; 340/995, 988, 990, 340/903, 461, 705; 345/582, 581, 417, 420
See application file for complete search history.

(56) References Cited

U.S. PATENT DOCUMENTS

| | | | | |
|---|---|---|---|---|
| 5,155,774 A | * | 10/1992 | Numagami | 382/113 |
| 5,416,478 A | | 5/1995 | Morinaga | 340/995.27 |
| 5,621,457 A | | 4/1997 | Ishiwaka et al. | 348/78 |
| 5,734,357 A | | 3/1998 | Matsumoto | 345/7 |
| 5,936,553 A | | 8/1999 | Kabel | 340/995.14 |
| 6,005,492 A | * | 12/1999 | Tamura et al. | 340/937 |
| 6,014,608 A | * | 1/2000 | Seo | 701/207 |
| 6,249,214 B1 | * | 6/2001 | Kashiwazaki | 340/425.5 |
| 6,285,317 B1 | * | 9/2001 | Ong | 342/357.13 |
| 6,360,170 B1 | * | 3/2002 | Ishikawa et al. | 701/300 |
| 6,397,140 B1 | * | 5/2002 | Minowa et al. | 701/96 |
| 6,400,405 B1 | * | 6/2002 | Tomida et al. | 348/333.05 |
| 6,442,476 B1 | * | 8/2002 | Poropat | 701/207 |
| 6,549,835 B1 | * | 4/2003 | Deguchi et al. | 701/41 |
| 6,577,249 B1 | * | 6/2003 | Akatsuka et al. | 340/988 |
| 2003/0158657 A1 | * | 8/2003 | Agnew et al. | 701/208 |

FOREIGN PATENT DOCUMENTS

DE  198 13 300 A1  10/1999

(Continued)

*Primary Examiner*—Jack Keith
*Assistant Examiner*—Tuan C To
(74) *Attorney, Agent, or Firm*—Harness, Dickey & Pierce, P.L.C.

(57) ABSTRACT

A method and device is for displaying driving instructions. The aim is to achieve a better consistency between the image recorded of the surrounding terrain by the vehicle camera and presented in the driver's field of vision, and the keyed-in calculated driving instruction. For this purpose, the inclination of the vehicle about its longitudinal axis and lateral axis relative to the road surface as well as the incline of the road or the three-dimensionality of the terrain are taken into consideration when a keyed-in driving instruction from the angle of view of the driver is produced.

19 Claims, 5 Drawing Sheets

FOREIGN PATENT DOCUMENTS

| | | |
|---|---|---|
| DE | 100 37 573 A1 | 2/2002 |
| EP | 0406946 | 1/1991 |
| EP | 0 406 946 B1 | 9/1994 |
| EP | 0 406 946 B2 | 9/1994 |
| EP | 0 762 361 A1 | 3/1997 |
| EP | 1 024 467 A2 | 8/2000 |
| EP | 0124467 | 8/2000 |
| EP | 1 037 188 A2 | 9/2000 |
| EP | 1037188 | 9/2000 |
| JP | 2001114048 A * | 4/2001 |
| WO | WO 99/54848 | 10/1999 |

* cited by examiner

FIG. 3 CONSIDERATION OF TOPOGRAPHY IN DETERMINING THE ROUTE RECOMMENDATION

METHOD AND DEVICE FOR DISPLAYING DRIVING INSTRUCTIONS, ESPECIALLY IN CAR NAVIGATION SYSTEMS

This application is the national phase under 35 U.S.C. § 371 of PCT International Application No. PCT/DE02/02844 which has an International filing date of Aug. 1, 2002, which designated the United States of America and which claims priority on German Patent Application number DE 101 38 719.9 filed Aug. 7, 2001, the entire contents of which are hereby incorporated herein by reference.

FIELD OF THE INVENTION

The invention generally relates to a method and a device with which driving instructions are displayed. Preferably, they are displayed in an image of the vehicle's surroundings as a function of the current location and a specified destination.

BACKGROUND OF THE INVENTION

A method and a device are known from patent specification EP 0 406 946 B1. However problems occur here when it comes to matching the driving instructions to the image of the vehicle's surroundings.

A method for the 3-dimensional display of road junctions for vehicle navigation systems is disclosed in the publication WO 99/54848, wherein the angle of observation is selected based on the complexity of the road junction or route. Increasing the angle of observation gives more space between roads in the display, thus making it easier to interpret.

Finally a viewing direction detection device for vehicles is known from publication U.S. Pat. No. 5,621,457. Here, the viewing direction and position of a driver's eyes are detected so that information is always displayed in the driver's viewing direction.

SUMMARY OF THE INVENTION

An object of an embodiment of the invention is to specify a method or a device with which the driving instructions can be matched in an optimal manner to the image showing the vehicle's surroundings.

An object may be achieved by a method or an arrangement wherein driving instructions are displayed.

An embodiment of the invention resides in, in essence, the fact that when calculating the perspective view from the viewpoint of the driver, the inclination of the vehicle about its longitudinal and lateral axes relative to the road surface is taken into account, as is the incline of the road or the three-dimensionality of the terrain, when generating overlaid driving instructions. As such, a better correlation between the image of the surroundings recorded by the camera is recorded in the field of vision of the driver and the overlaid driving instructions.

The method according to an embodiment of the invention allows the road into which the driver is to turn to be displayed to the driver in a clear manner that is not susceptible to misinterpretation, like a hand pointing to the road junction ahead. For this, a video image of the road scenario ahead is displayed on a screen in the field of vision of the driver. The recommended route is marked on this image, in particular the turning point by the use of an overlaid driving instruction, for example an arrow or a continuous line. The video image is updated continuously; and the overlaid marking is constantly adjusted in accordance with the new vehicle position.

BRIEF DESCRIPTION OF THE DRAWINGS

Further advantages, features and details of the invention will become evident from the description of illustrated embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
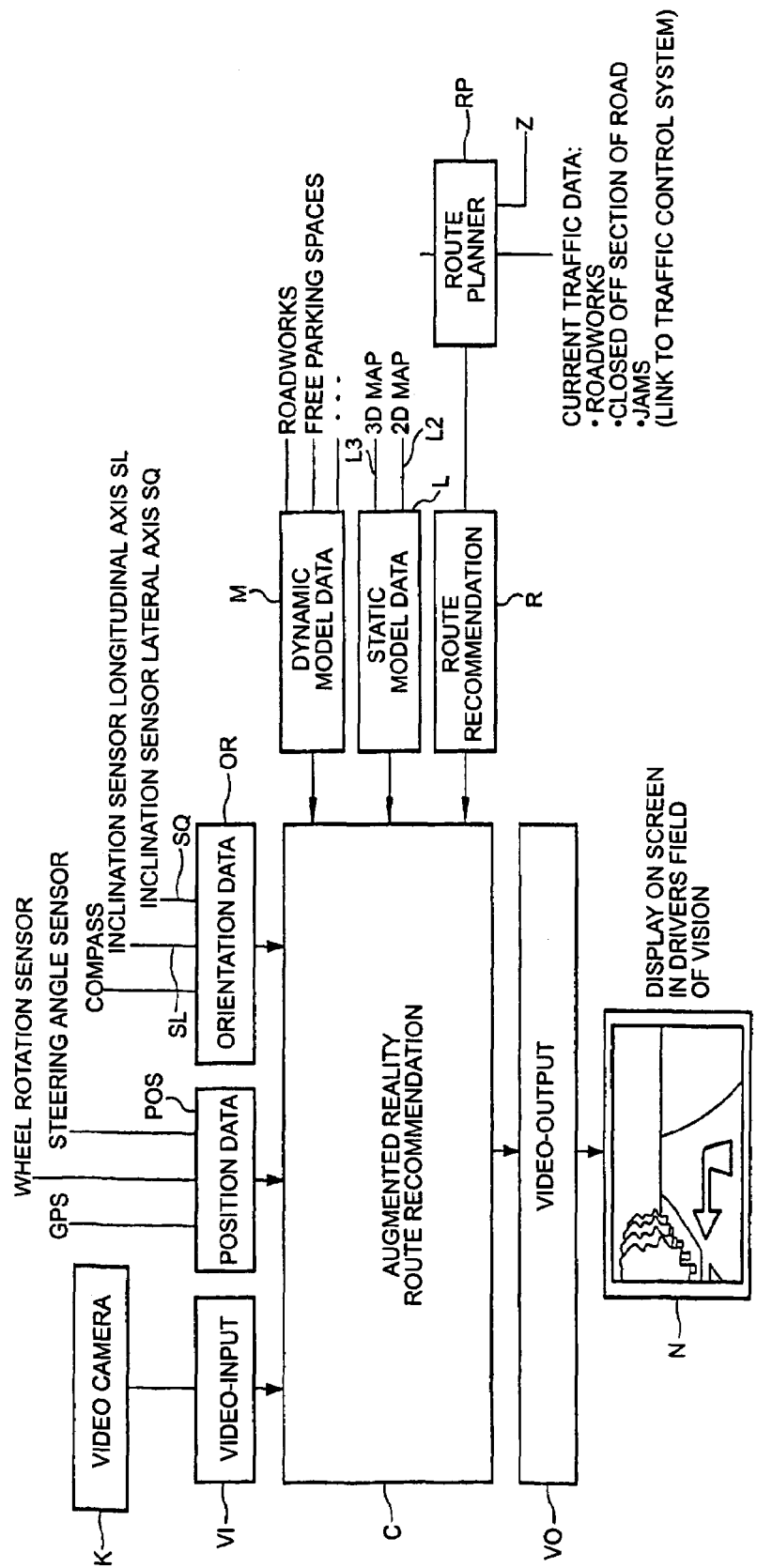
FIG. 1 shows a diagram of the overall system with the main input and output variables.

FIG. 1 shows a schematic diagram of the device according to an embodiment of the invention with its input and output variables. In the overall system, a destination Z is input into a route planner RP that uses a two-dimensional map L2 and current traffic data to generate a route recommendation R and feeds this to a calculation unit C. The calculation unit C receives static model data from the two-dimensional map L2 and a further three-dimensional map L3 as well as dynamic model data M, for example relating to roadworks and free parking lots. A vehicle camera K in the form of a video camera supplies video input data VI for the calculation unit C. The calculation unit C also receives position data POS and orientation data OR, whereby the position data POS, i.e. the real position information, is received in two dimensions via a GPS (global positioning system) receiver and augmented by the map L3 in the third dimension or is received directly in three dimensions. The position data POS can also be supplemented by signals from a wheel revolution sensor and/or a steering angle sensor.

The orientation data is typically determined by a compass located in the vehicle and by an inclination sensor SL for the longitudinal axis and an inclination sensor SQ for the lateral axis. 3D gyros can be used as sensors for example. The calculation unit C supplies video output data VO for a navigation display unit N. The navigation display unit N for example includes a screen that displays the image of the surroundings as recorded by the camera K in the field of vision of the driver and this is supplemented by the driving instructions matched to the image, whereby the driving instructions are combined with the original image in any ratio or have a certain transparency or the image is replaced completely by the driving instructions themselves where the driving instructions occur.

Figure 2:
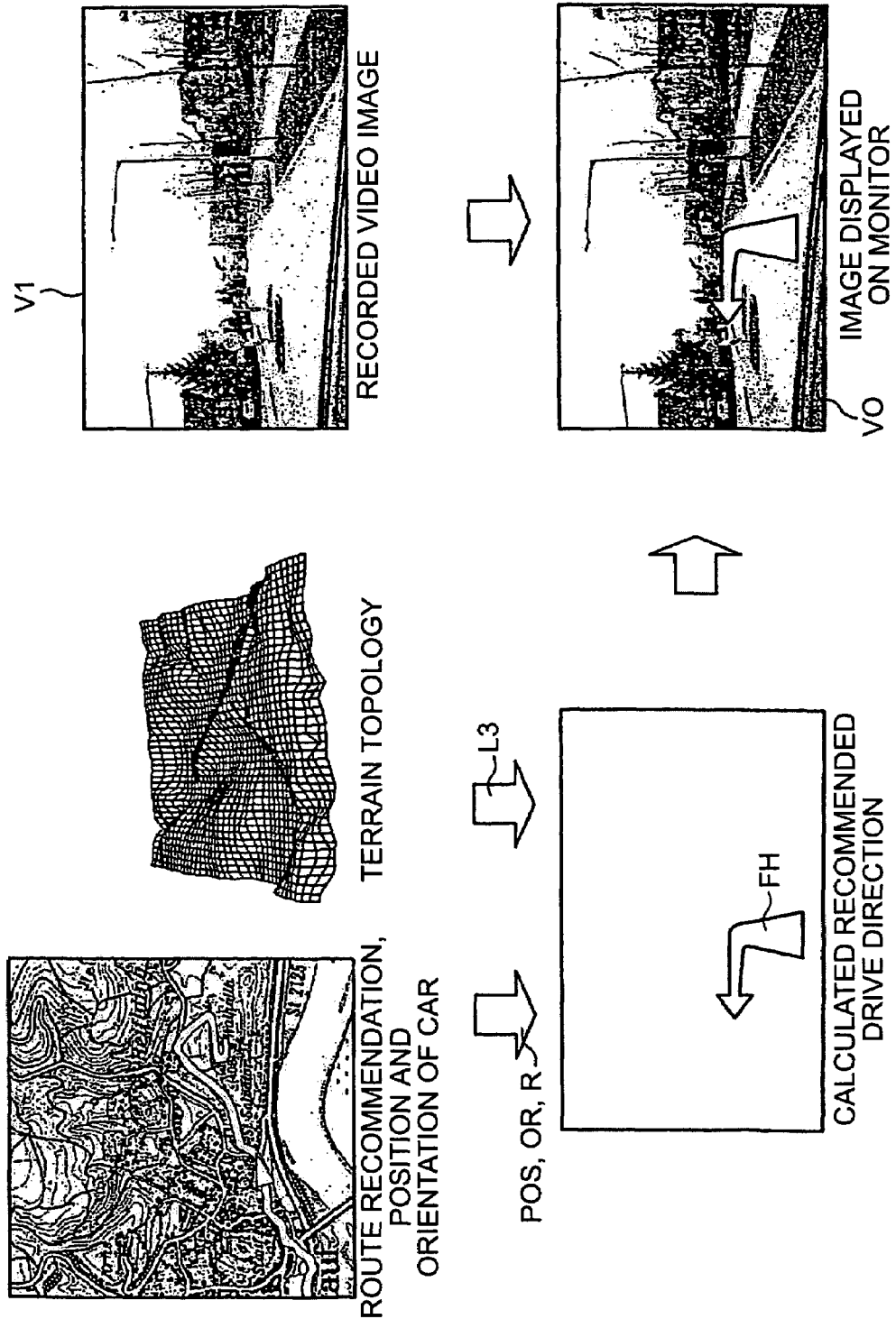
FIG. 2 shows a general diagram to clarify the generation and superimposition of the driving instructions.

FIG. 2 shows the generation of the video output signal VO as a function of the video input signal VI of the camera and calculated driving instructions FH. The navigation system is fitted with a camera K which records what is happening in front of the vehicle and displays it on the screen in the field of vision of the driver. A 3D terrain model of the current surroundings is generated from the 3D map data L3. Based on the vehicle position, the virtual position A of the vehicle and therefore that of the camera K is determined in the terrain model.

The orientation OR or direction of travel and the inclination of the vehicle in the longitudinal and lateral directions as determined by the sensors SL and SQ are used to calculate the virtual direction of the camera in the terrain model. The further route for the next section of the journey is inserted into the terrain model according to navigation system data preferably as a 3D object (a driving instruction) that is preferably generated using Bezier curves. The direction of travel is "rendered" for the current position and viewing direction of the camera, i.e. it is projected perspectively from the 3D world into a 2D world taking into account the focal length of the real camera. The image thus obtained is overlaid on the video image on the screen, thereby showing the driver the further route R and where necessary corresponding additional information M in an image of the real world. The camera can record the image of the vehicle's surroundings in the infrared range at night and in fog, thereby also assuming the role of a night vision display unit.

In a further exemplary embodiment of the invention the driving instructions are projected directly onto the windshield of the vehicle itself. A suitable projection device in this context is a beamer that is installed in the vehicle or even a film behind the windshield, for example OLEDs (optical light emitting diodes) that display the required information at the appropriate points while the rest remain transparent.

As the real image of the surroundings already exists in the driver's field of vision, the vehicle camera may be omitted and the position, for example height and deviation from the steering wheel center position and the direction of focus of the driver's eyes are then determined by way of a tracking system. This is combined with the information about the position, orientation and inclination of the vehicle in the calculation of the position and orientation of the "virtual camera", i.e. the counterpart of the eyes, in the terrain model. As with the exemplary embodiment with camera and screen, this is used to calculate an image of the driving instructions matching to the real image, which is projected via a projection device onto or into the windshield.

Figure 3:
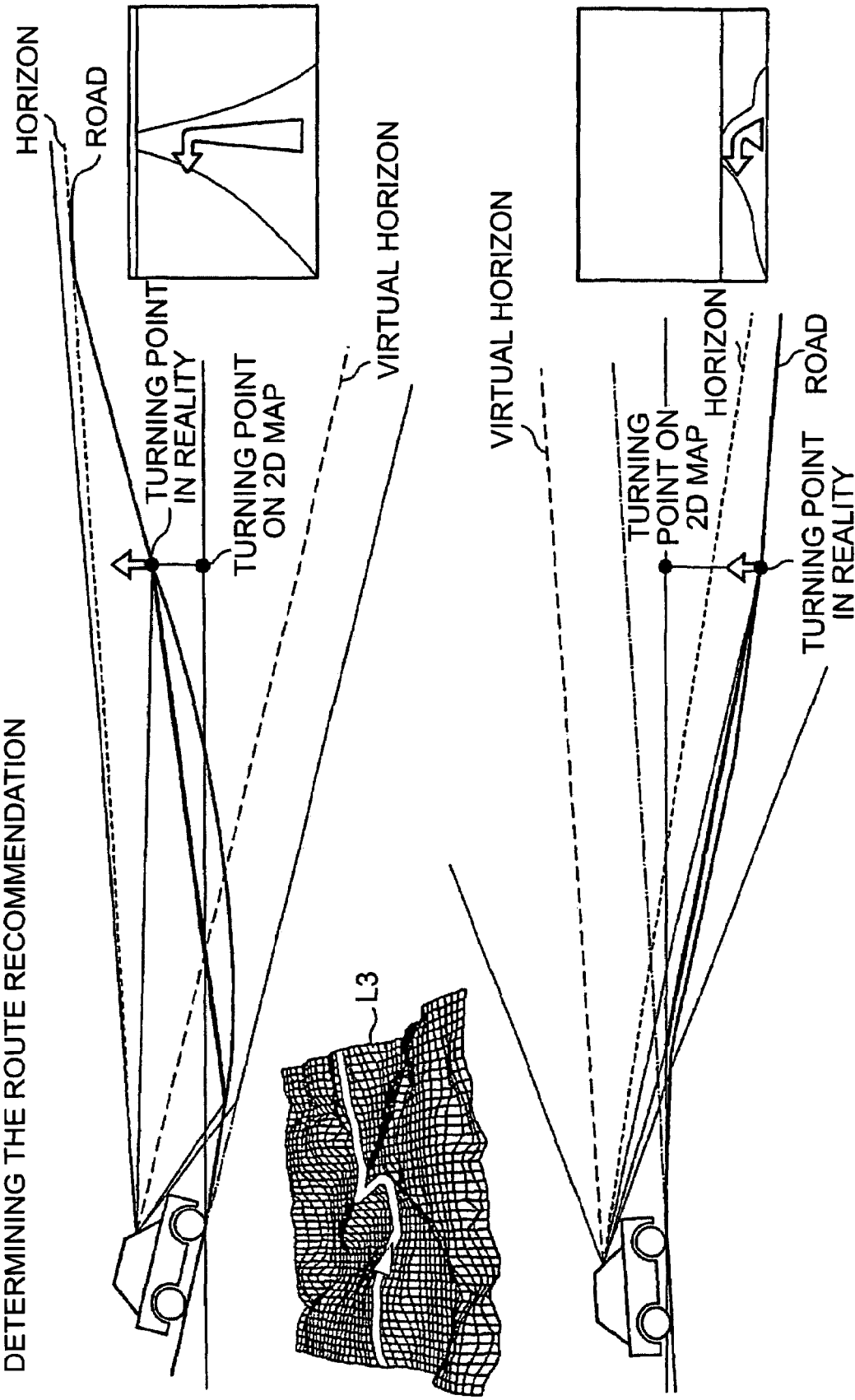
FIG. 3 shows a general diagram to clarify the way in which the topography is taken into account when determining the driving instructions.

FIG. 3 uses two different terrain scenarios to clarify how the topography has to be taken into account when determining the route recommendation or driving instructions for display on the navigation display unit. In the first case the vehicle is traveling down a slope toward the bottom of a valley with a view of a slope opposite, with the result that the horizon is located almost at the upper edge of the screen on the navigation display unit and a navigation point or turning point at a specific distance from the vehicle therefore appears closer to the upper edge of the screen than when the vehicle is traveling straight. The lower part of the diagram in FIG. 3 however shows precisely the reverse situation, in which the vehicle has not yet reached the highest point of a knoll and the line of vision is directed upward. Here the horizon is closer to the lower edge of the screen on the navigation display unit and as a result the navigation point at a certain distance from the vehicle is also displayed closer to the lower edge than for example when the vehicle is traveling straight on the level or in the first example.

The method for calculating the position of the individual points of a navigation recommendation or driving instructions, in particular the turning point, is explained in more detail below when incorporated in the video image taking into account perspective distortion.

The object of the consideration below is to mark navigation points of the real 3D world in a video image. For each individual navigation point the position of the corresponding point (x and y coordinates) must thereby be determined in the 2D image recorded by the camera. The following are included in such calculations in addition to the focal length of the camera lens and the location of the camera in the vehicle:

for the x coordinates:
the horizontal direction from the camera position to the navigation point as well as the inclination of the vehicle in the lateral direction (e.g. on bends with camber)

for the y coordinates:
the distance of the navigation point from the camera position, the difference between the topographical height of the navigation point and the camera position as well as the inclination of the vehicle in the longitudinal direction (e.g. in the case of slopes).

For the sake of simplicity the following formulae only describe the calculation of the y coordinates for the projection of a navigation point from the 3D world into the two-dimensional video image.

Let

Figure 6:
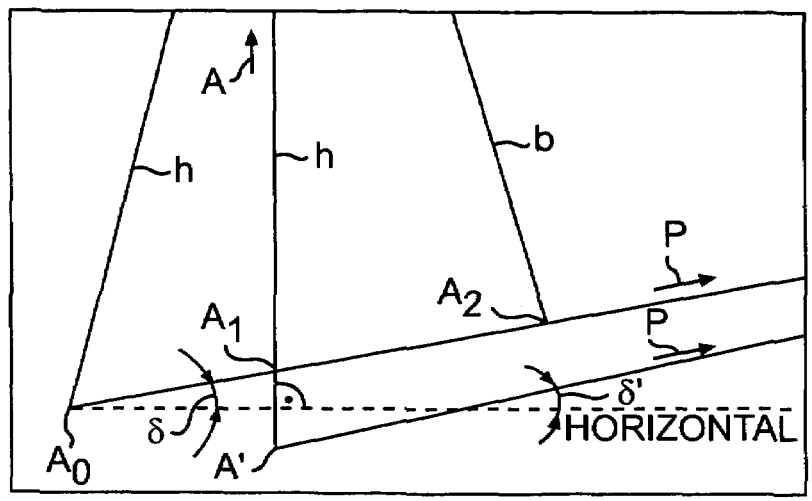
FIG. 6 shows a diagram to clarify a simplification of the calculation and FIG. 7 shows a display on the navigation display unit to clarify the adjustment of the y-position of the navigation point.
Figure 5:
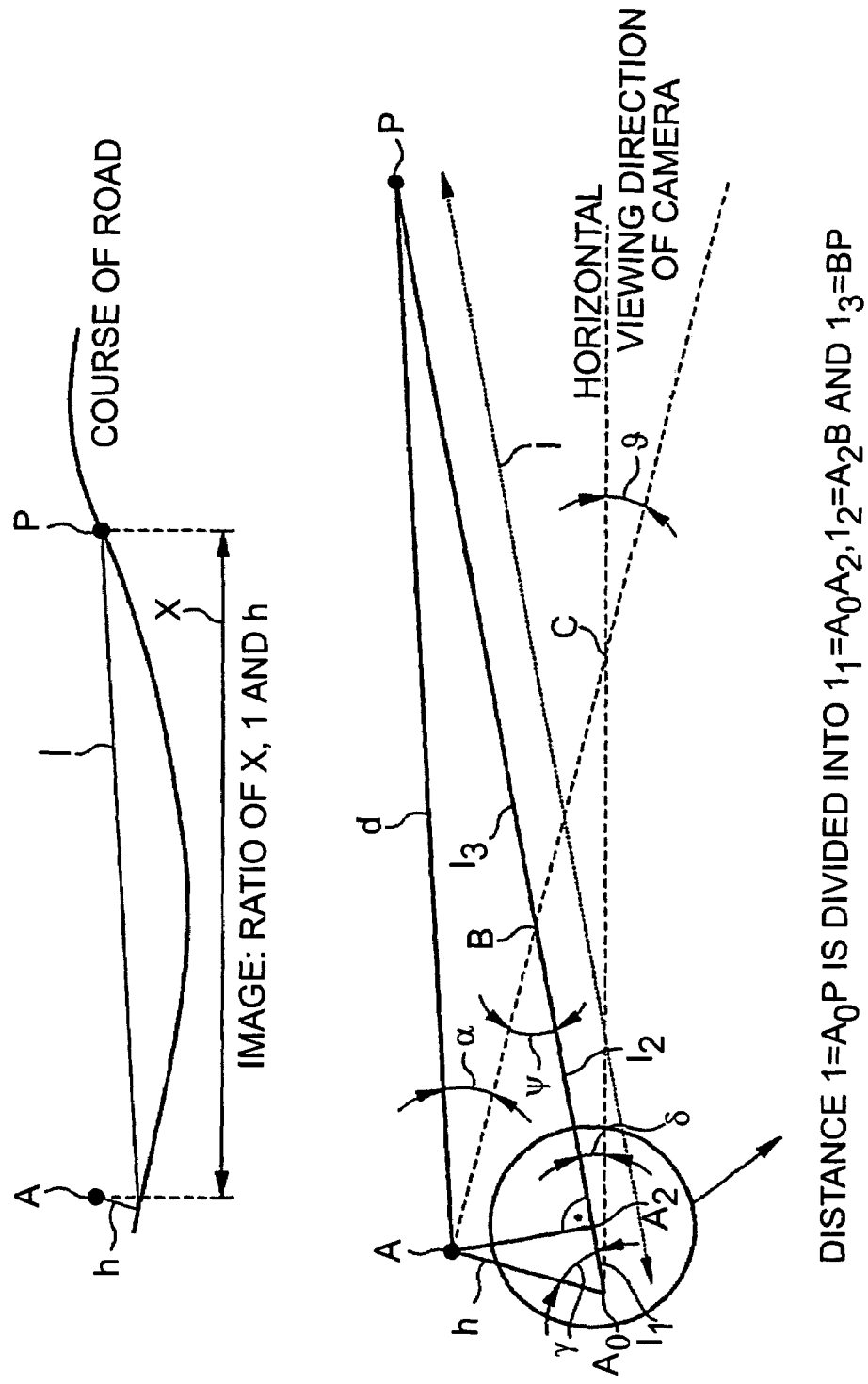
FIG. 5 shows a diagram to clarify the calculation of the viewing angle in the vertical, at which the navigation point is viewed from the camera.

A be the position of the car camera K as shown in FIG. 5 and FIG. 6 (e.g. longitude, latitude and height above sea level)

h be the height of the camera axis above the street as shown in FIG. 5 and FIG. 6

P be the position of the navigation point in question as shown in FIG. 5 and FIG. 6

Figure 4:
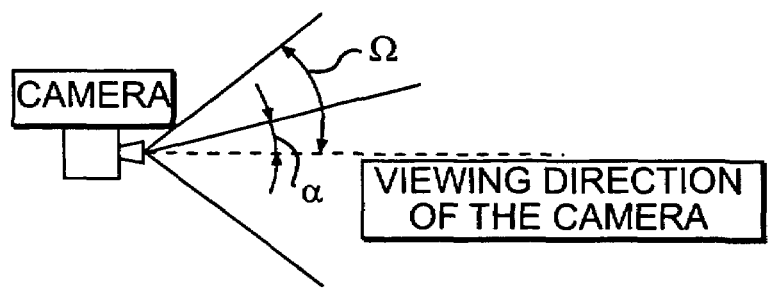
FIG. 4 shows a diagram of the vehicle camera with angle data.

$\Omega$ be half the aperture angle of the vehicle camera, as shown in FIG. 4

$\theta$ be the angle of inclination of the camera viewing direction relative to the horizontal as shown in FIG. 5

Figure 7:
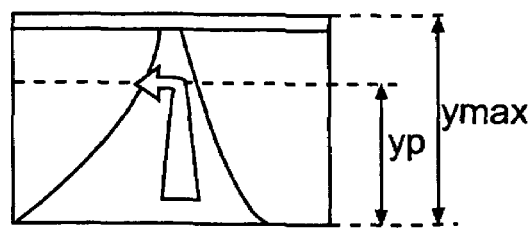

$y_{max}$ be the overall height of the display area of the navigation display unit as shown in FIG. 7.

The values for A result from the vehicle positioning system, the value for P originates from a 3D map; h and $\Omega$ are vehicle-specific parameters; $\theta$ is determined using sensors.

The following are to be found $\alpha$ the angle shown in FIG. 4 and FIG. 5 in the vertical, at which the navigation point is seen from the camera, and $y_P$ the y-position of the navigation point, calculated from the lower edge when displayed on the navigation display unit, as shown in FIG. 7.

The following are obtained from the values of A, P and h x the distance as shown in FIG. 5 of the navigation point from the camera position in the horizontal according to a 2D map;

d the distance as shown in FIG. 5 of the navigation point from the camera position in the 3D world;

l the distance as shown in FIG. 5 of the navigation point from the point vertically below the camera position on the road taking into account the different heights of the navigation point and the camera position;

$\delta'$ the angle as shown in FIG. 6 between the line A'P and the horizontal, whereby the line A'A represents a vertical line going from the point A to the horizontal with length h;

$\delta$ the angle as shown in FIG. 5 and FIG. 6 between l and the horizontal: as h<<l, the difference between $\delta$ and $\delta'$ is below the measurement accuracy of the positioning system, i.e. $\delta \approx \delta'$ applies.

The following formula then applies for the angle $\alpha$:

$$\frac{l_3}{\sin\alpha} = \frac{d}{\sin(180-\varphi)} = \frac{d}{\sin\varphi} \Leftrightarrow \alpha = \arcsin\frac{l_3 \cdot \sin\varphi}{d}$$

$$l_1 + l_2 = \frac{h}{\sin\varphi}$$

$$l_1 = h \cdot \cos\gamma = h \cdot \cos(90-\varphi) \Leftrightarrow l_1 = h \cdot \sin\varphi$$

$$l_3 = l - (l_1 + l_2) \Leftrightarrow l_3 = l - \frac{h}{\sin\varphi}$$

$$b = h \cdot \sin\gamma = h \cdot \sin(90-\varphi) = h \cdot \cos\varphi$$

$$d = \sqrt{(l-l_1)^2 + b^2} = \sqrt{(l-h\cdot\sin\varphi)^2 + (h\cdot\cos\varphi)^2}$$

$$\Rightarrow \alpha = \arcsin\left(\frac{l\cdot\sin(\varphi) - h}{\sqrt{(l-h\cdot\sin\varphi)^2 + (h\cdot\cos\varphi)^2}}\right)$$

$\Delta A_0 BC$ gives $\varphi = \delta + \vartheta$

As h<<l, the difference between $\delta$ and $\delta'$ is below the measurement accuracy of the positioning system. This means that $\varphi \approx \delta' + \theta$ $$\Rightarrow \alpha = \arcsin\left(\frac{l\cdot\sin(\delta' + \vartheta) - h}{\sqrt{(l-h\cdot\sin(\delta'+\vartheta))^2 + (h\cdot\cos(\delta'+\vartheta))^2}}\right)$$

The angle $\alpha$ and the aperture angle of the camera $\Omega$ are used to calculate the y-position $y_P$ of the image of the navigation point on the display taking into account the terrain topography and the perspective distortion:

$$\frac{\Omega + \alpha}{2\Omega} = \frac{y_P}{y_{max}} \Rightarrow y_P = \frac{(\Omega + \alpha) \cdot y_{max}}{2\Omega}$$

As an option, further information relating to the route and the destination is displayed in the navigation image, in some cases taking into account weather conditions and dynamic traffic data, with direct reference to positions in the terrain shown:

permissible maximum speed at current position;
braking points or recommended speed before bends or junctions;
the further course of the route beyond bridges, knolls, after underpasses, etc;
street names, major road signs;
pointers to free parking spaces or current roadworks and jams;
pointers to shops or sights and much more.

Such additional information can be adjusted by appropriate positioning and/or enlargement or reduction of the relevant symbol or for example by tilting the lettering parallel to the horizon.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for displaying driving instructions, wherein the surroundings of a vehicle are recorded in a field of vision of a driver by a vehicle camera and augmented by driving instructions on a navigation display unit as a function of a destination and current position of the vehicle, comprising:
   determining a current geographical position of the vehicle camera in three dimensions, a current orientation of the vehicle camera being determined in a horizontal plane and a current angle of inclination of the camera viewing direction relative to the horizontal being determined;
   deriving a particular position of a navigation point from a three-dimensional map to generate driving instructions;
   calculating at least one viewing angle in a vertical dimension, at which the navigation point is viewed from the vehicle camera as a function of the current angle of inclination; and
   adjusting display of the driving instructions as a function of the at least one viewing angle at least in the vertical dimension on the navigation display unit.

2. A method according to claim 1, wherein the at least one viewing angle $\alpha$ is calculated using the formula $$\alpha = \arcsin\left(\frac{l\cdot\sin(\delta' + \vartheta) - h}{\sqrt{(l-h\cdot\sin(\delta'+\vartheta))^2 + (h\cdot\cos(\delta'+\vartheta))^2}}\right)$$

whereby
   l is the distance of the navigation point P from the point resulting as the point of intersection between the normals of road surface to vehicle camera and the road surface itself, h is the height of the camera axis above the road,
   $\theta$ is the angle of inclination of the camera viewing direction relative to the horizontal, and
   $\delta'$ is the angle between a line A'P and the horizontal, whereby the line A'A represents a perpendicular to the horizontal of length h starting from point A.

3. A method according to claim 2, wherein the vertical position $y_p$ of the navigation point calculated from the lower edge is calculated for display on the navigation display unit by the formula $$y_P = \frac{(\Omega + \alpha) \cdot y_{max}}{2\Omega}$$

whereby $\Omega$ is half the aperture angle of the vehicle camera and $y_{max}$ is the overall height of the display area of the navigation display unit.

4. A method according to claim 1, wherein the display of at least one additional instruction on the navigation display unit is modified as a function of at least one viewing angle.

5. A method according to claim 1, wherein the navigation display unit includes a screen and the image recorded by the camera is at least partially overlaid by the driving instructions in the area where the driving instructions occur.

6. The method of claim 1, wherein the method is for displaying driving instructions in a car navigation system.

7. A method according to claim 2, wherein the display of at least one additional instruction on the navigation display unit is modified as a function of at least one viewing angle.

8. A method according to claim 2, wherein the navigation display unit includes a screen and the image recorded by the camera is at least partially overlaid by the driving instructions in the area where the driving instructions occur.

9. A method according to claim 3, wherein the display of at least one additional instruction on the navigation display unit is modified as a function of at least one viewing angle.

10. A method according to claim 3, wherein the navigation display unit includes a screen and the image recorded by the camera is at least partially overlaid by the driving instructions in the area where the driving instructions occur.

11. A method according to claim 4, wherein the navigation display unit includes a screen and the image recorded by the camera is at least partially overlaid by the driving instructions in the area where the driving instructions occur.

12. A method for displaying driving instructions, comprising:
    determining a current geographical position of at least one eye of a driver, in three dimensions, using a tracking system, wherein a current position of the vehicle and a current angle of inclination of a longitudinal axis of the vehicle relative to a horizontal are determined in order to establish the current field of vision of the driver;
    deriving a particular position of a navigation point as a function of a destination from a three-dimensional map to generate driving instructions;
    calculating at least one viewing angle in a vertical dimension, at which the navigation point is viewed from at least one eye of the driver, based on the current angle of inclination; and
    adjusting display of the driving instructions to the relative field of vision of the driver as a function of the viewing angle at least in the vertical dimension.

13. The method of claim 12, wherein the method is for displaying driving instructions in a car navigation system.

14. The method of claim 12, wherein the adjusted display is on the windshield of the vehicle.

15. The method of claim 12, wherein the adjusted display is in the windshield of the vehicle.

16. A device for displaying driving instructions, comprising:
    a vehicle camera, configured to record surroundings in a field of vision of a vehicle driver;
    a device, configured to enable three-dimensional recording of the position of at least one of the vehicle and the vehicle camera and orientation of the vehicle camera in a horizontal plane;
    at least one sensor, configured to detect at least one angle of inclination of the camera viewing direction relative to the horizontal;
    a device, configured to scan a three-dimensional map for use in determining a three-dimensional position of a particular navigation point; a device, adapted to calculate at least one viewing angle in a vertical dimension at which the navigation point is viewed from the vehicle camera in such a way that the viewing angle is adapted to be calculated as a function of the angle of inclination of the camera viewing direction; and
    a navigation display unit, configured to adjust the display of driving instructions as a function of the at least one viewing angle at least in the vertical dimension.

17. The device of claim 16, wherein the device is for displaying driving instructions in a car navigation system.

18. A device for displaying driving instructions, comprising:
    a device for three-dimensional detection of a position of the vehicle and orientation of the vehicle in a horizontal plane;
    a tracking system for three-dimensional detection of a position of at least one eye of a driver of the vehicle, relative to the vehicle;
    at least one sensor for detecting at least one angle of inclination of a longitudinal axis of the vehicle relative to the horizontal;
    a device for scanning a three-dimensional map, used to determine the three-dimensional position of a particular navigation point as a function of the destination;
    a device for calculating at least one viewing angle in a vertical dimension at which the navigation point is viewed by the driver in such a way that the viewing angle is calculateable as a function of the angle of inclination of the camera viewing direction; and
    a navigation display unit for displaying the driving instructions at least one of in and on the windshield, having been adjusted as a function of the at least one viewing angle at least in the vertical dimension to the field of vision of the driver.

19. The device of claim 18 wherein the device is for displaying driving instructions in a car navigation system.

* * * * *